(12) United States Patent
Gershfang et al.

(10) Patent No.: US 10,108,972 B2
(45) Date of Patent: Oct. 23, 2018

(54) EVALUATING ADVERTISING EFFECTIVENESS IN A VIRTUAL UNIVERSE

(75) Inventors: Igor Y. Gershfang, Chicago, IL (US); Rick A. Hamilton, II, Charlottesville, VA (US); Neil A. Katz, Parkland, FL (US); James W. Seaman, Falls Church, VA (US); Adam R. Snopek, Chicago, IL (US); Richard Young, Chicago, IL (US)

(73) Assignee: International Business Machines Corporation, Armonk, NY (US)

(*) Notice: Subject to any disclaimer, the term of this patent is extended or adjusted under 35 U.S.C. 154(b) by 1909 days.

(21) Appl. No.: 12/628,383

(22) Filed: Dec. 1, 2009

(65) Prior Publication Data

US 2011/0131517 A1    Jun. 2, 2011

(51) Int. Cl.
   *G06Q 30/02*    (2012.01)

(52) U.S. Cl.
   CPC ......... *G06Q 30/02* (2013.01); *G06Q 30/0246* (2013.01)

(58) Field of Classification Search
   CPC ....................................................... G06Q 30/02
   USPC ..................................................... 705/14.41
   See application file for complete search history.

(56) References Cited

U.S. PATENT DOCUMENTS

| 6,036,601 | A  |   | 3/2000  | Heckel |
|-----------|----|---|---------|--------|
| 6,329,986 | B1 |   | 12/2001 | Cheng |
| 6,954,728 | B1 |   | 10/2005 | Kusumoto et al. |
| 2008/0204449 | A1 |   | 8/2008 | Dawson et al. |
| 2008/0207328 | A1 | * | 8/2008 | Slough et al. ................. 463/42 |
| 2009/0157482 | A1 | * | 6/2009 | Jung et al. ..................... 705/10 |
| 2009/0157495 | A1 | * | 6/2009 | Cahuzac et al. ............... 705/14 |
| 2010/0164956 | A1 | * | 7/2010 | Hyndman et al. ............ 345/427 |
| 2010/0306055 | A1 | * | 12/2010 | Kolb .......................... 705/14.55 |

* cited by examiner

*Primary Examiner* — Daniel M Sorkowitz
(74) *Attorney, Agent, or Firm* — William H. Hartwell; Maxine L. Barasch; Keohane & D'Alessandro PLLC (57) ABSTRACT

Aspects of this invention are directed toward determining the effectiveness of advertising in a virtual universe. Specifically, under the present invention, a visit by an avatar to a region of the VU that includes targeted advertising content is registered. Then, the following avatar attributes are determined: a proximity to the target advertising content by the avatar; an avatar directionality of the avatar with respect to the target advertising content; a camera directionality of a camera object associated with the avatar; and a time with respect to which the avatar may be exposed to the target advertising content in the region. Thereafter, at least one score is assigned to the visit, the proximity, the directionality, and the time. An effectiveness score is then calculated based on the at least one score. The overall effectiveness of the target advertising content is then calculated based on the at least one score.

24 Claims, 10 Drawing Sheets

FIG. 10

EVALUATING ADVERTISING EFFECTIVENESS IN A VIRTUAL UNIVERSE

FIELD OF THE INVENTION

This invention relates generally to virtual universes and more specifically to evaluating advertising effectiveness in a virtual universe.

BACKGROUND OF THE INVENTION

Virtual universes (VUs) or virtual worlds are computer-based simulated environments intended for its users or residents to inhabit and interact via avatars, which are personas or representations of the users of the virtual universes. VUs are also known as metaverses or "3D Internet". These types of virtual universes are now most common in multiplayer online games, such as Second Life®, which is a trademark of Linden Research Inc. in the United States. Avatars in these types of virtual universes, which can number well over a million, have a wide range of business and social experiences.

Advertising is an important revenue source in any VU, and extends to business, social, and recreational aspects. The managing of advertisements in these virtual worlds is vitally important. Since the creation of a virtual advertisement is relatively cheaper than in the real world (digital bits versus physical materials), more effort can be put into the content, location, and audience. It is difficult for advertisers in the real world to provide dynamic advertisements due to the lack of information available to them on what visual impressions are being made, and whether the advertisements are noticed by the user (e.g., what advertisements are truly effective).

SUMMARY OF THE INVENTION

Existing electronic social and business environments, such as Internet web pages, provide a relatively easy mechanism for measuring content viewing based on "page-hits". That is to say, if an end user navigates to a particular Internet web page, it is likely that all or most of the page content has been viewed by the user. In many cases, an entire page will load as a single viewable image such that the user has no choice but to view all content displayed or, alternately, a "pop-up" may be launched to ensure that the visitor has viewed the desired content. These techniques are particularly of interest to sponsors and advertisers, as they require some level of verification that their ads have been viewed. This is not as easily accomplished with emerging 3D virtual environments, where context is extensive from the standpoint of a user, and a "location-hit" cannot be correlated easily to a conventional Internet web-page-hit. Within a VU environment, a location-hit simply indicates that an avatar (resident) has accessed a specific region (or associated sub-space within a region), but given the vastness of these environments, without further investigation it cannot be determined that the visiting avatar has or has not viewed desired advertising content in any given space. As such, aspects of this invention are directed towards determining the effectiveness of advertising in a virtual universe.

A first aspect of the present invention provides a method for evaluating advertising effectiveness in a Virtual Universe (VU), comprising: registering a visit by an avatar to a region of the VU that includes a target advertising content; determining a proximity to the target advertising content by the avatar; determining an avatar directionality of the avatar with respect to the target advertising content; determining a time with respect to which the avatar may be exposed to the target advertising content in the region; assigning at least one score to the visit, the proximity, the directionality, and the time; and calculating an effectiveness score based on the at least one score.

A second aspect of the present invention provides a method for evaluating advertising content effectiveness in a Virtual Universe (VU), comprising: assigning a visit score based on a quantity of visits by a set of avatars to a region of the VU that includes a target advertising content; assigning a set of proximity scores based on a proximity of each of the set avatars to the target advertising content in the region; assigning a set of avatar directionality scores based on a direction each of the set of avatars is facing with respect to the target advertising content in the region; assigning a set of time scores based on a length of time each of the set of avatars is exposed to the target advertising content in the region; and determining on overall effectiveness of the target advertising content based on the visit score, the set of proximity scores, the set of directionality scores, and the set of time scores.

A third aspect of the present invention provides a computer system for evaluating advertising content effectiveness in a Virtual Universe (VU), comprising: at least one processing unit; memory operably associated with the at least one processing unit; and a utility stored in the memory and executable by the at least one processing unit, the utility comprising: a module for registering a visit by an avatar to a region of the VU that includes a target advertising content; a module for determining a proximity to the target advertising content by the avatar; a module for determining an avatar directionality of the avatar with respect to the target advertising content; a module for determining a time with respect to which the avatar may be exposed to the target advertising content in the region; a module for assigning the at least one score to the visit, the proximity, the directionality, and the time; and a module for calculating an effectiveness score based on the at least one score.

A fourth aspect of the present invention provides a computer readable medium containing a program product for evaluating advertising content effectiveness in a Virtual Universe (VU), the computer readable medium comprising program code for causing a computer to: register a visit by an avatar to a region of the VU that includes a target advertising content; determine a proximity to the target advertising content by the avatar; determine an avatar directionality of the avatar with respect to the target advertising content; determine a time with respect to which the avatar may be exposed to the target advertising content in the region; assign the at least one score to the visit, the proximity, the directionality, and the time; and calculate an effectiveness score based on the at least one score.

A fifth aspect of the present invention provides a method for deploying a system for evaluating advertising content effectiveness in a Virtual Universe (VU), comprising: providing a computer infrastructure being operable to: register a visit by an avatar to a region of the VU that includes a target advertising content; determine a proximity to the target advertising content by the avatar; determine an avatar directionality of the avatar with respect to the target advertising content; determine a time with respect to which the avatar may be exposed to the target advertising content in the region; assign the at least one score to the visit, the proximity, the directionality, and the time; and calculate an effectiveness score based on the at least one score.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For the purposes of this disclosure, the following terms have the associated meanings:
1. An avatar is a graphical representation the user selects that others may see, often taking the form of a cartoon-like human.
2. An avatar in a virtual world is often referred to as a resident.
3. An agent is the user's account, upon which the user may build an avatar, and which is tied to the inventory of assets the user owns.
4. A region is a virtual area of land within the VU, typically residing on a single server.
5. An area is a specific place within a region such as a building or a room.
6. A login environment is the region and areas that are loaded by default when the avatar enters the virtual world.
7. Assets, avatars, the environment, and anything visual comprises UUIDs, unique identifiers tied to geometric data (distributed to users as textual coordinates), textures (distributed to users as graphics files such as JPEG2000 files), and effects data (rendered by the user's client according to the user's preferences and user's device capabilities).

Existing electronic social and business environments, such as Internet web pages, provide a relatively easy mechanism for measuring content viewing based on "page-hits". That is to say, if an end user navigates to a particular internet web page, it is likely that all or most of the page content has been viewed by the user. In many cases, an entire page will load as a single viewable image such that the user has no choice but to view all content displayed or, alternately, a "pop-up" may be launched to ensure that the visitor has viewed the desired content. These techniques are particularly of interest to sponsors and advertisers, as they require some level of verification that their ads have been viewed. This is not as easily accomplished with emerging 3D virtual environments, where context is extensive from the standpoint of a user, and a "location-hit" cannot be correlated easily to a conventional Internet web-page-hit. Within a VU environment, a location-hit simply indicates that an avatar (resident) has accessed a specific region (or associated sub-space within a region), but given the vastness of these environments, without further investigation, it cannot be determined that the visiting avatar has or has not viewed desired advertising content in any given space.

As such, aspects of this invention are directed toward determining the effectiveness of advertising in a virtual universe. Specifically, under the present invention, a visit by an avatar to a region of the VU that includes targeted advertising content is registered. Then, the following avatar attributes are determined: a proximity to the target advertising content by the avatar; an avatar directionality of the avatar with respect to the target advertising content; a camera directionality of a camera object associated with the avatar; and a time with respect to which the avatar may be exposed to the target advertising content in the region. Thereafter, at least one score is assigned to the visit, the proximity, the directionality, and the time. An effectiveness score is then calculated based on the at least one score. The overall effectiveness of the target advertising content is then calculated based on the at least one score.

It should be understood in advance that as used herein, the concept of evaluating the effectiveness of advertising content in a VU region is intended to encompass (among other things) the noticability of that content (e.g., it's placement, color scheme, size, etc.).

Figure 1:
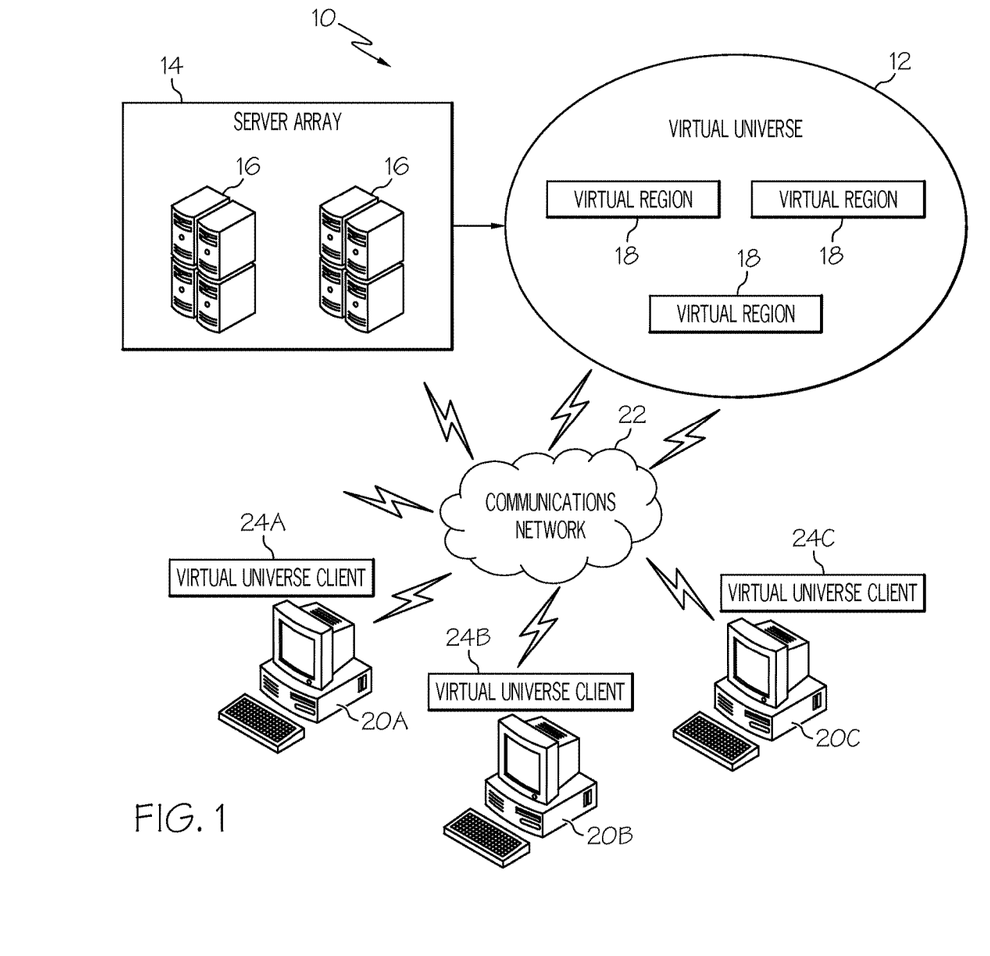
FIG. 1 shows a high-level schematic diagram showing a networking environment for providing a virtual universe according to one embodiment of this invention.

FIG. 1 shows a high-level schematic diagram showing a networking environment 10 for providing a virtual universe 12 according to one embodiment of this invention in which monitoring user demographics within the virtual universe can be utilized. As shown in FIG. 1, networking environment 10 comprises a server array or grid 14 comprising a plurality of servers 16 each responsible for managing a portion of virtual real estate within virtual universe 12. A virtual universe provided by a multiplayer online game, for example, can employ thousands of servers to manage all of the virtual real estate. The virtual content of the virtual real estate that is managed by each of servers 16 within server array 14 shows up in virtual universe 12 as a virtual region 18 made up of objects, textures, and scripts. Like the real world, each virtual region 18 within virtual universe 12 comprises a landscape having virtual content, such as buildings, stores, clubs, sporting arenas, parks, beaches, cities, and towns all created by administrators or residents of the universe that are represented by avatars. These examples of virtual content are only illustrative of some things that may be found in a virtual region and are not limiting. Further-more, the number of virtual regions 18 shown in FIG. 1 is only for illustration purposes and those skilled in the art will recognize that there may be many more regions found in a typical virtual universe, or even only one region in a small virtual universe. FIG. 1 also shows that users operating computers 20A-20C (hereinafter referred to generally as 20) interact with virtual universe 12 through a communication network 22 via virtual universe clients 24A-24C (hereinafter referred to generally as 24) that reside in computers 20, respectively. Below are further details of virtual universe 12, server array 14, and virtual universe client 24.

One of the ways that users of virtual universe 12 can use virtual universe client 24 to interact with the universe is to view advertising content within the virtual universe. An illustrative but non-limiting listing of advertisements that can be viewed through virtual universe client 24 includes items such as billboards, store window displays, etc. As will be further described herein, embodiments of this invention are directed to facilitating the management of these advertisement assets in virtual universe 12.

Figure 2:
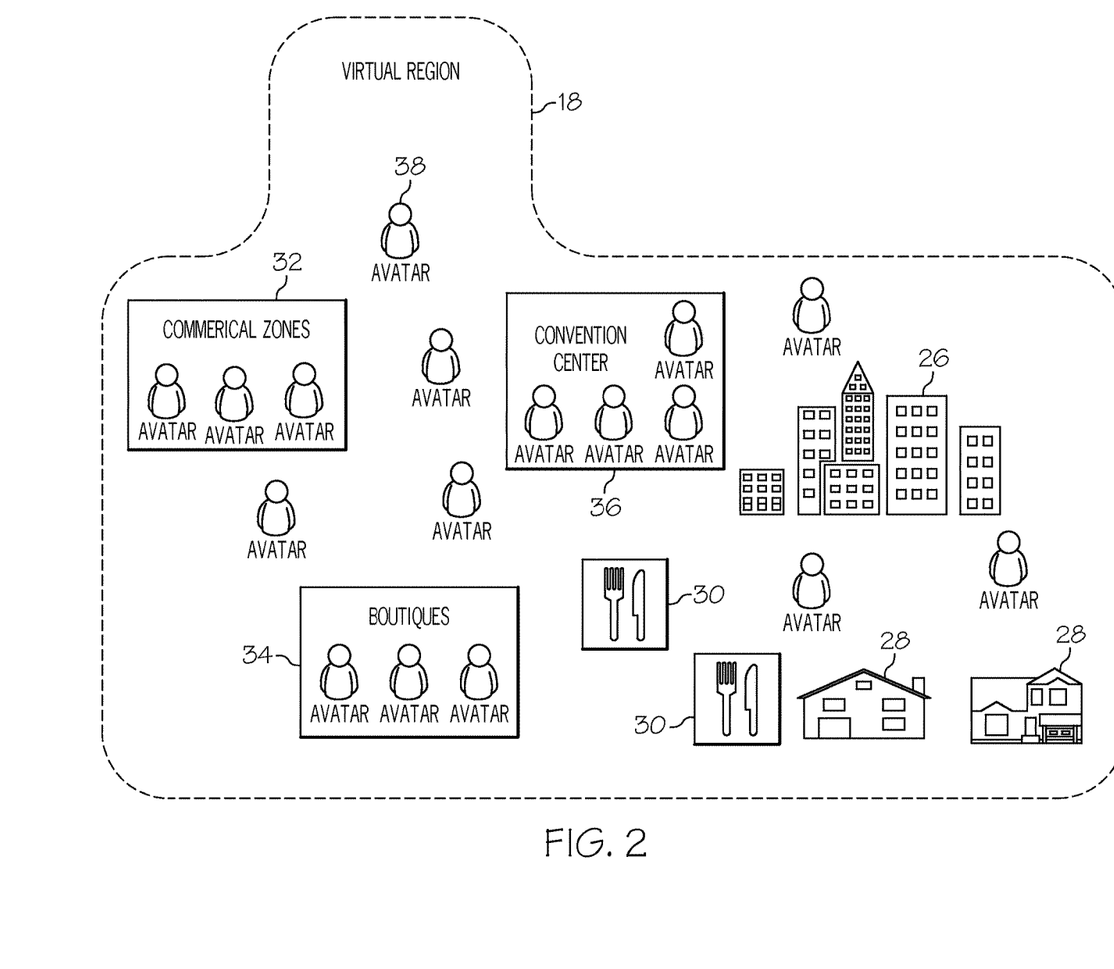
FIG. 2 shows a more detailed view of a virtual region shown in the virtual universe of FIG. 1.

FIG. 2 shows a more detailed view of what one virtual region 18 in virtual universe 12 may comprise. As an example, virtual region 18 shown in FIG. 2 comprises a downtown office center 26, homes 28, restaurants 30, a supermarket 32, a shopping mall 34 for shopping, and a convention center 36 for meetings and various conventions. Residents or avatars 38, which as mentioned above, are personas or representations of the users of the virtual universe, roam all about the virtual region by walking, driving, flying, or even by teleportation or transportation, which is essentially moving through space from one point to another, more or less instantaneously. These examples of virtual content in virtual region 18 shown in FIG. 2 are only illustrative of some items that may be found in a virtual region, and those skilled in the art will recognize that these regions can have many more items that can be found in the real world universe as well as things that do not presently exist in the real world.

Figure 3:
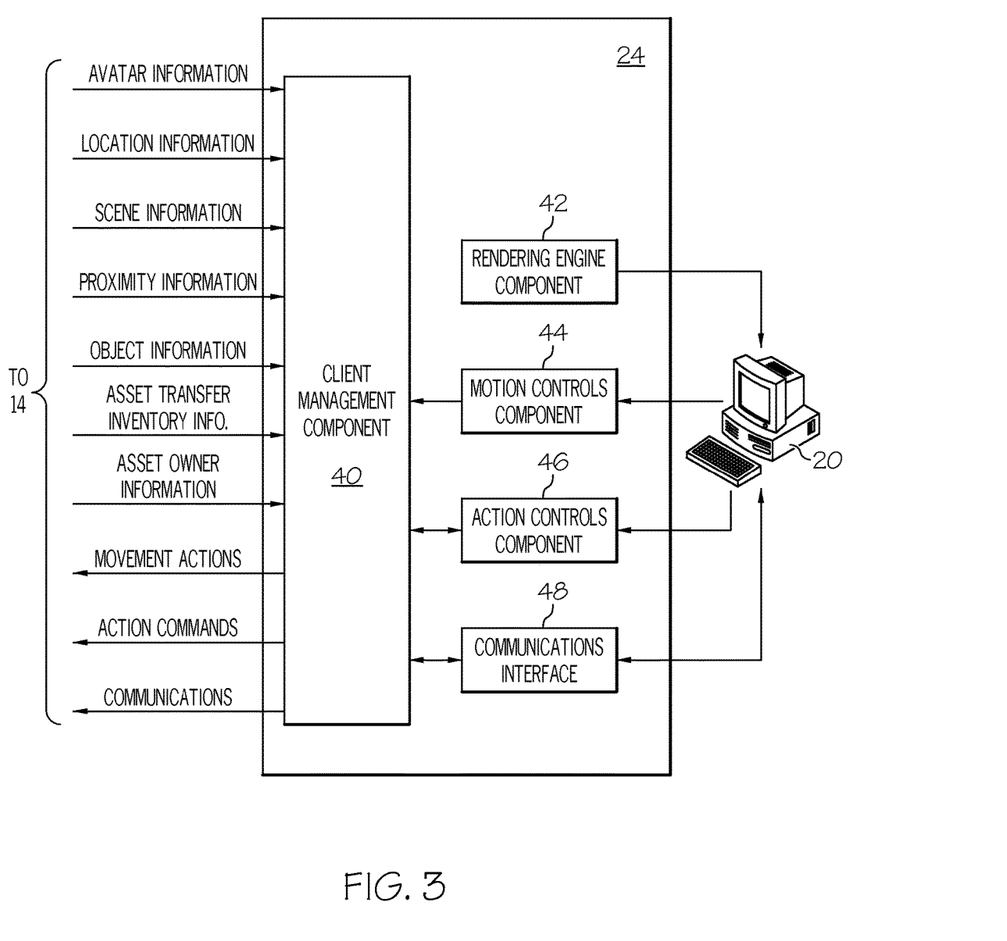
FIG. 3 shows a more detailed view of the virtual universe client shown in FIG. 1.

FIG. 3 shows a more detailed view of virtual universe client 24 shown in FIG. 1. Virtual universe client 24, which enables users to interact with virtual universe 12, comprises a client management component 40, which manages actions, commands, and communications made by a user through computer 20, and information received from the virtual universe through server array 14. A rendering engine component 42 enables the user of computer 20 to visualize his or her avatar within the surroundings of the particular region of virtual universe 12 where the avatar is presently located.

A motion controls component 44 enables the user's avatar to make movements through the virtual universe. In one embodiment, movements through the virtual universe can include, for example, gestures, postures, walking, running, driving, flying, etc. An action controls component 46 enables the user to perform actions in the virtual universe such as buying items for his or her avatar or even for their real-life selves, building homes, planting gardens, etc. These actions are only illustrative of some possible actions that a user can perform in the virtual universe and are not limiting. A communications interface 48 enables a user to communicate with other users of virtual universe 12 through modalities such as chatting, instant messaging, gesturing, talking, and electronic mail (e-mail).

FIG. 3 shows the various types of information received by client management component 40 from the virtual universe through the server array 14. In particular, client management component 40 receives avatar information about the avatars that are in proximity to the user's avatar. In addition, client management component 40 receives location information about the area that the user's avatar is near (e.g., what region or island he or she is in), as well as scene information (e.g., what the avatar sees). Client management component 40 also receives proximity information, which contains information on what the user's avatar is near, and object information, which is information about nearby objects. Client management component 40 receives avatar and location information, which information is utilized by the advertisement effectiveness utility 53. FIG. 3 also shows the movement commands and action commands that are generated by the user and sent to the server array via client management component 40, as well as the communications that can be sent to the users of other avatars within the virtual universe.

Figure 4:
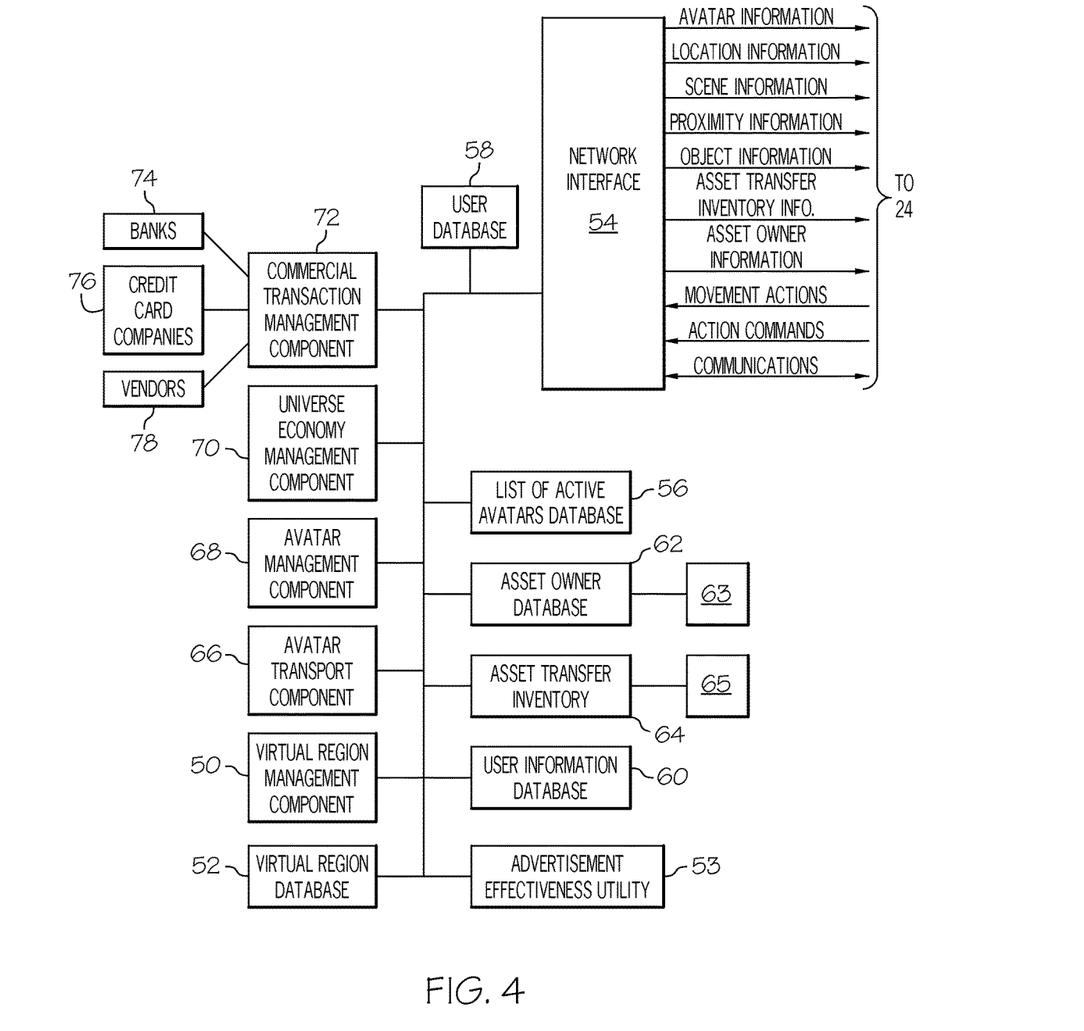
FIG. 4 shows a more detailed view of some of the functionalities provided by the server array shown in FIG. 1.

FIG. 4 shows a more detailed view of some of the functionalities provided by server array 14 shown in FIG. 1. In particular, FIG. 4 shows a virtual region management component 50 that manages a virtual region within the virtual universe. Virtual region management component 50 manages what happens in a particular region, such as the type of landscape in that region, the number of homes, commercial zones, boutiques, streets, parks, restaurants, etc. For example, virtual region management component 50 would allow the owner of a particular region or establishment within the region to specify requirements for entering or remaining within the region that could potentially affect certain avatar characteristics. Those skilled in the art will recognize that virtual region management component 50 can manage many other facets within the virtual region.

FIG. 4 also shows a network interface 54 that enables server array 14 to interact with virtual universe client 24 residing on computer 20. In particular, network interface 54 communicates active avatar, location, scene, proximity, script, object, asset transfer inventory, asset owner, user database, and user information to the user through virtual universe client 24. The network interface receives movement and action commands, as well as communications from the user via virtual universe client 24.

FIG. 4 also shows an advertisement effectiveness utility 53, which provides the capability to evaluate the effectiveness of advertising contents in the virtual universe, as will be further described below. In this embodiment, advertisement effectiveness utility 53 resides on the same computer system as server array 14, and communicates directly to virtual universe 12 and its users via virtual universe client 24. In other embodiments, advertisement effectiveness 53 might reside on the same computer as virtual universe client 24, have components that reside on both server array 14 and virtual universe client 24, or reside on separate computers in direct communication with virtual universe servers 16 and virtual universe clients 24.

As shown in FIG. 4, there are several different databases for storing information. In particular, virtual region database 52 stores information on all of the specifics in virtual region 18 that virtual region management component 50 is managing. Virtual region database 52 contains metadata information about the objects, texts, and scripts associated with the virtual content in the virtual region(s). Active avatars database 56 contains a list of all the avatars that are online in the virtual universe 12, while databases 58 and 60 contain information on the actual human users or avatars in the virtual universe 12. In one embodiment, user database 58 contains general information on the users such as names, email addresses, locales, interests, ages, preferences, etc., while user information database 60 contains information on the users such as billing information (e.g., credit card information) for taking part in transactions.

Databases 52, 56, 58, 60 and 63 contain information on the avatars of the users that reside in virtual universe 12. In one embodiment, virtual region database 52, list of active avatars database 56, user database 58, user information database 60, and asset owner database 63 are tracked for avatars within a multidimensional space of the virtual region 18. The information is typically in the form of metadata associated with the virtual content of each user's avatar(s). An illustrative but non-limiting list of avatar usage information includes appearance, asset inventory, past activities, and purchases. Those skilled in the art will recognize that this listing of avatar usage information is illustrative of possible items and is not exhaustive. For example, other user information may include name of the owner, e-mail address of the owner, the address of the originating computer, or any other type of user information.

Each user demographic may be associated with a piece of executable code or other data, called a script, which may affect rendering in some fashion during a session in the virtual universe. A clothing asset, for example, may be rendered with a script that causes the clothing to shimmer. A virtual pet, in another example, may render as an automated avatar that follows the user's avatar within the virtual universe.

Virtual region database 52, list of active avatars database 56, user database 58, user information database 60, and asset owner database 63 are databases that contain demographic information within advertisement effectiveness utility 53. In an exemplary embodiment, asset transfer inventory 64 comprises a listing table 65 having a foreign key to an asset table 63 within asset owner database 62, such that querying the asset transfer inventory 64 pulls information from asset table 63 to listing table 65. Those skilled in the art will recognize that other techniques for transferring data between databases 52, 56, 58, 60, and 63 are possible within the scope of the invention.

Those skilled in the art will also recognize that databases 52-63 may contain additional information if desired. Databases 52-63 may be consolidated into a single database or table, divided into multiple databases or tables, or clustered into a database system spanning multiple physical and logical devices. Further, although the above information is shown in FIG. 4 as being stored in databases, those skilled in the art will recognize that other configurations and means of storing information can be utilized. For example, virtual region database 52, list of active avatars database 56, user database 58, user information database 60, and asset owner database 63 might reside on the same computers as virtual universe client 24, have components that reside on both server array 14 and virtual universe client 24, or reside on separate computers in direct communication with virtual universe servers 16 and virtual universe client 24.

An avatar transport component 66 enables users to transport, which, as mentioned above, allows avatars to transport through space from one point to another point instantaneously. As a result, an avatar could, for example, travel from a business region to an entertainment region to experience a concert.

An avatar management component 68 keeps track of what the avatars are doing while in the virtual universe. For example, avatar management component 68 can track where each avatar is presently located in the virtual universe, as well as what activities it is performing, or has recently performed. An illustrative but non-exhaustive list of activities can include shopping, eating, talking, recreating, etc.

Because a typical virtual universe has a vibrant economy, server array 14 has functionalities that are configured to manage the economy. In particular, a universe economy management component 70 manages transactions that occur within the virtual universe between avatars. In one embodiment, virtual universe 12 will have its own VU currency ($VU) that users pay for with real life money. The users can then take part in commercial transactions for their avatars through universe economy management component 70. For example, an avatar might want to pay for a service that provides discovery and transfer of assets within the virtual universe. In this case, the avatar would make the purchase of this service using the $VU. In some instances, the user may want to take part in a commercial transaction that benefits him or her and not an avatar. In this case, a commercial transaction management component 72 allows the user to participate in the transaction. For example, while walking around a commercial zone, a user may see a pair of shoes that he or she would like for themselves and not the user's avatar. In order to fulfill this type of transaction and others similarly related, commercial transaction management component 72 interacts with banks 74, credit card companies 76 and vendors 78.

Figure 5:
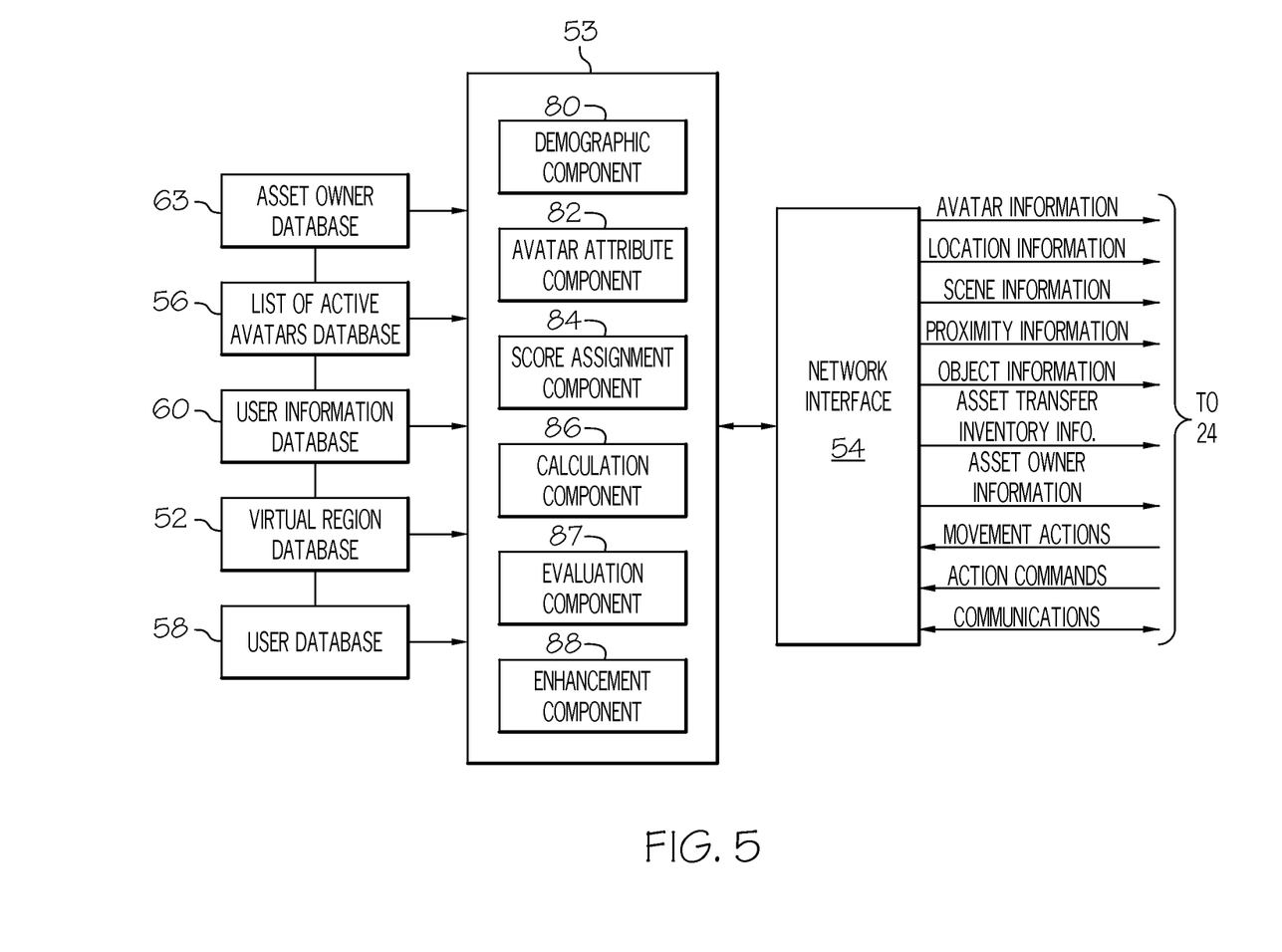
FIG. 5 shows an advertisement effectiveness utility according to one embodiment of this invention that operates in the environment shown in FIG. 1.
Figure 6:
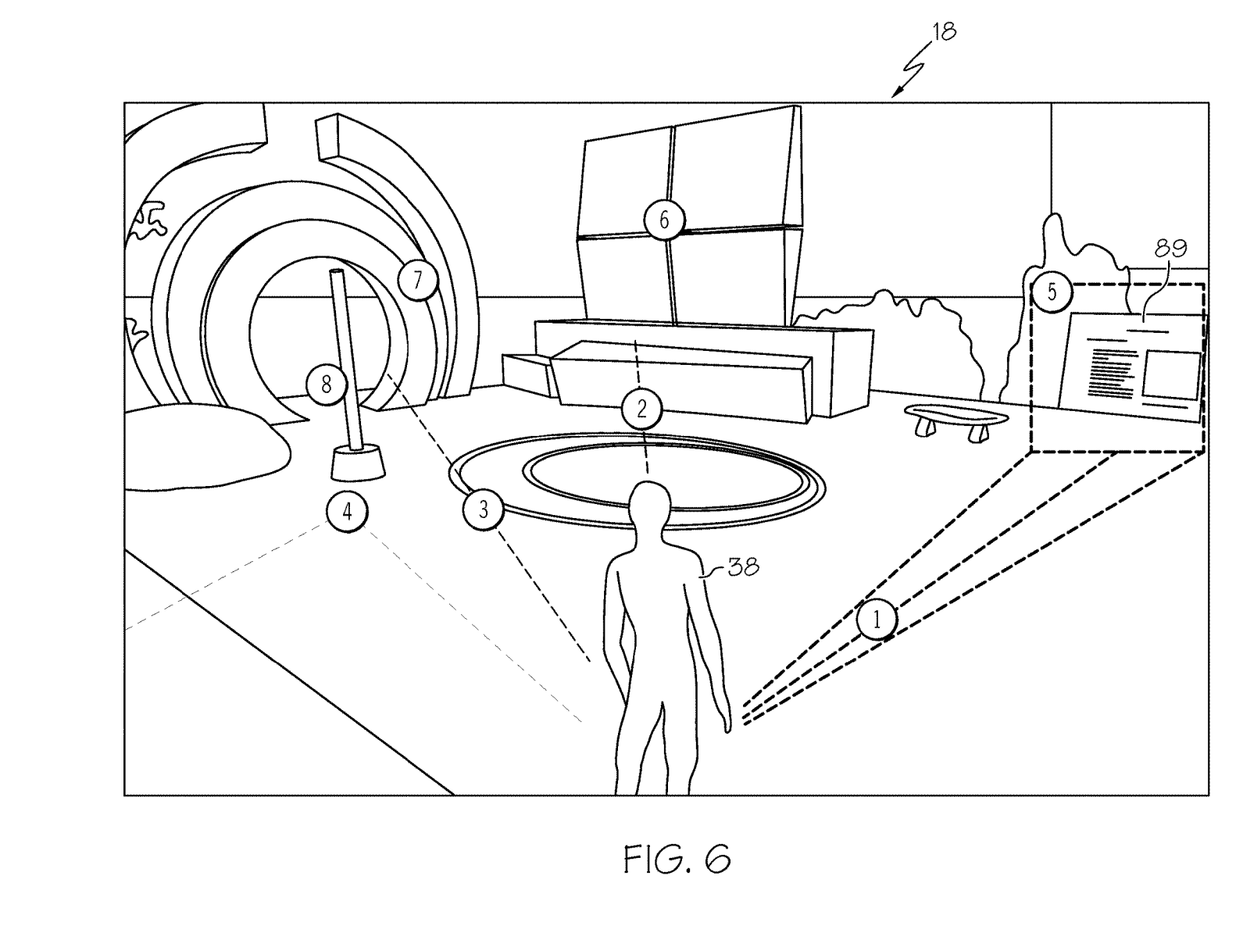
FIG. 6 shows a region of a virtual universe having a target advertising content according to one embodiment of the present invention.

Referring now to FIG. 5, a more detailed view of advertisement effectiveness utility 53 is shown. As depicted, advertisement effectiveness utility 53 comprises avatar demographic component 80, avatar attribute component 82, score assignment component 84, calculation component 86, evaluation component 87, and enhancement component 88. To better explain the teachings of the present invention, reference is now made to FIG. 6. As shown, FIG. 6 provides a visual example of a typical VU region 18. As is the nature of emerging 3D environments, the location is immersive and multidimensional, and provides many options for a visiting resident. In this example, specific location (5) contains the desired advertising content 89, where location (A) is the entry point or otherwise current point of the target avatar. As is clear from this singular and simple example, a VU resident has many options for navigation within any give VU realm. Avatar 38 in location (A) here may choose to move towards advertising content 89 via paths (1), towards the rock cliff (6) via path (2), towards a connecting portal (7) via path (3), or towards a directional sign post (8) and into a new direction via path (4). Using conventional internet measurement techniques, the fact that avatar 38 in position (A) has accessed the "page", would constitute a "page-hit", and thus would indicate a success for the sponsor or advertiser (and may generate a bill). Given the nature of VU environments, however, a "page-hit" alone cannot be used as a success indicator for an advertiser.

As further shown in FIG. 6, avatar 38 may choose to take numerous paths that do not avail avatar 38 to viewing of the embedded advertising content 89. In a VU environment, therefore, instantiation of an avatar 38 in a desired advertising location represents potential, as opposed to assurance, of ad viewing. Methods are thus required to determine and measure specific behavior in virtual worlds regarding advertising.

Figure 7:
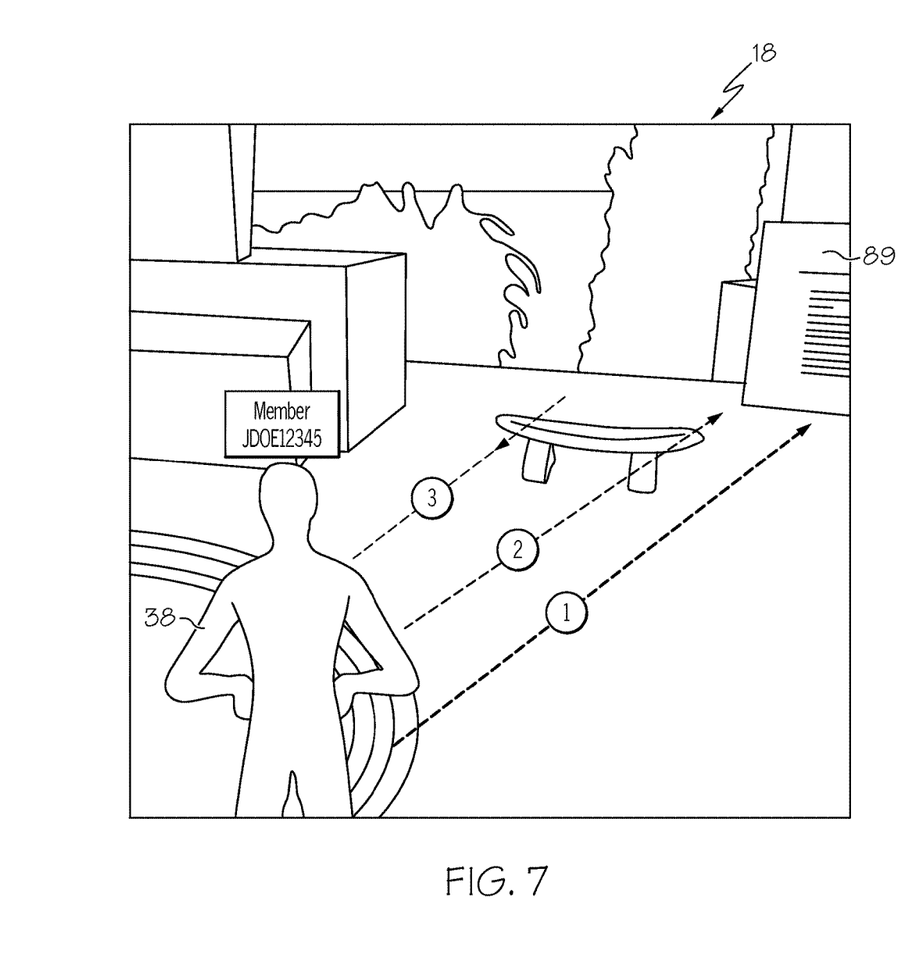
FIG. 7 shows the region of the virtual universe having the target advertising content of FIG. 6 according to another embodiment of the present invention.

An additional difficulty arises in a VU, whereby simple proximity to advertising content does not necessarily indicate viewing target advertising content 89 (hereinafter advertising content 89). FIG. 7 is useful in further explaining this concept. Referring to FIG. 2, path (1) would closely relate to a "page-hit" using current art. That is to say, that based on avatar 38's access to path (1), and the proximate position and directional association with the ad content, it is likely that a "page-hit", or viewing of the ad, has occurred. In contrast, however, paths (2) and (3) both lead avatar 38 to a bench that is in close proximity to the ad content, but simple proximity does not indicate success for an advertiser. In this example, avatar 38 taking path (2) takes a seat on the bench facing the ad billboard, and thus should be counted as a "hit". Avatar 38 taking path (3), on the other hand, is seated on the bench facing the opposite direction, and although in the same proximity, does not view advertising content 89. The present invention thus includes a new scoring mechanism for use in virtual worlds so that both potential and actual location based advertisement benefit can be identified and quantified.

Continuing this example, the "page-hit" (A) (FIG. 6) would indicate potential and would become the most basic value indicator for an advertiser/potential advertiser. The next measure of value would include simple proximity, whereby the closer avatar 38 comes to any given advertising content 89, the more likely that avatar is to actually view the content. Finally, maximum value is indicated to an advertiser when avatar 38 has met all criteria, beginning with a "page-hit", then also achieving proximity, and finally, meeting the key criteria of the present invention, avatar directionality. Once again referring to FIG. 7 above, the key difference between avatar 38's taking paths (2) and (3) is that one is directionally facing the ad (2), while the other is facing away (3). The present invention incorporates this measurement as the most meaningful when considering ad value in a VU. Added to this is the concept of directional duration, that is to say, that the amount of time that an avatar spends facing advertising content 89, increases the value thereof. Using FIG. 7 as an example, path (3) would provide no added value, as avatar 38 is facing away from advertising content 89. However, paths (1) and (2) could gain additional value over time, given that avatar 38 is in proximity to, and facing, the advertisement.

Figure 8:
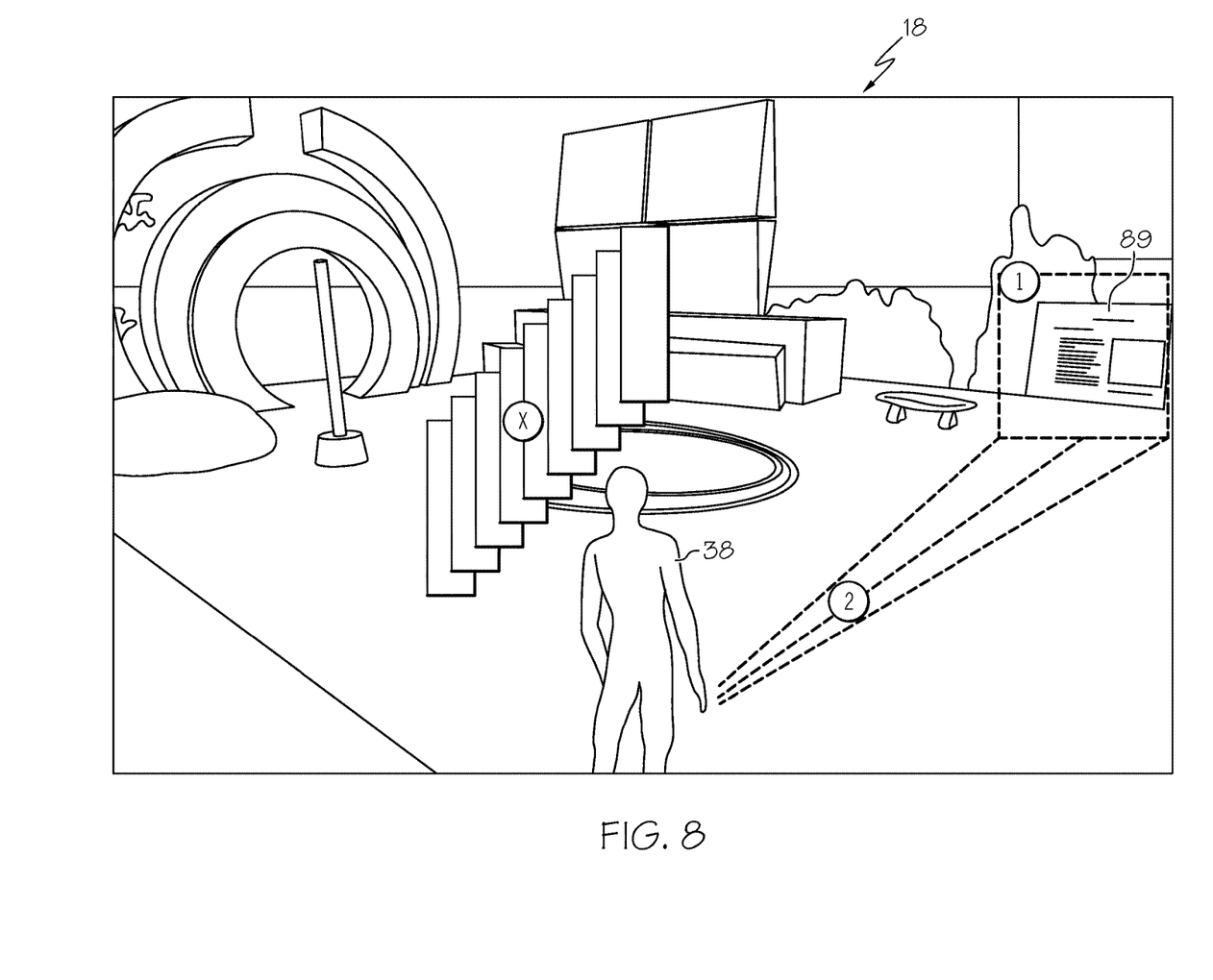
FIG. 8 shows the region of the virtual universe having the target advertising content of FIG. 6 according to another embodiment of the present invention.

A preferred embodiment would thus weigh each significant element of a region 18 visit based on value to an advertiser. Such a weighed hierarchy might be assigned as follows:
- page-hit
- page-hit+proximity
- page-hit+proximity+directionality
- page-hit+proximity+directionality+time An additional element of the present invention in a preferred embodiment provides for an automated mechanism to "advertisement steer". FIG. 8 below provides a basic example of advertisement steering. In this example, the avatar is located in the same VU region 18 as previously described. However, in this case it has been determined that ad steering would enhance the value of ad (1). In a preferred embodiment, barrier (X) would automatically be constructed such that avatars would, of necessity, navigate the area in such a way that both proximity and directionality favor the placement of the advertisement content. In various embodiments, the construction of barrier (X) would be automated or manual, would be fee-based or inclusive in an advertising contract, would conform to design styles of the area (wall, hedge, river, etc), and the like. In a typical embodiment, construction of barrier (X) could be based on the evaluation of advertising content 89 (e.g., based on the analysis described above). In summary, the present invention takes into account the unique requirements of a 3D environment in order to provide the maximum effectiveness of advertising content.

These concepts will be further explained with specific reference back to FIG. 5.

Referring now to FIG. 5, a more detailed view of advertisement effectiveness utility 53 is shown. As depicted, advertisement effectiveness utility 53 comprises avatar demographic component 80, avatar attribute component 82, score assignment component 84, calculation component 86, evaluation component 87, and enhancement component 88. Avatar demographic component 80 registers a visit by avatars to a region of the VU that includes a target advertising content. Specifically, whenever an avatar enters a region such as region 18 (FIGS. 6-8), a counter is advanced. Avatar attribute component 80 is configured/programmed to determine one or more of the following avatar attributes: a proximity to the target advertising content by the avatar; an avatar directionality of the avatar with respect to the target advertising content; camera directionality of a camera object of the avatar with respect to the target advertising content (e.g., time the target advertising content is "observed" by the avatar); and/or a time with respect to which the avatar may be exposed to the target advertising content in the region (e.g., time in the region itself, and/or time the avatar is facing or observing the target advertising content).

Based on this gathered information, score assignment component 84 will assign at least one score (e.g., numerical) to the visit, the proximity, the avatar directionality, the camera directionality, and the time. Thereafter, calculation component 86 will calculate an effectiveness score based on the at least one score. In doing so, calculation component 86 can mathematically manipulate scores. This can be any type of mathematical manipulation (e.g., summations, multipliers, weighting certain attributes, etc.). Once an effectiveness score is known, the effectiveness is evaluated by evaluation component 87 using any known means such as a comparison to a predetermined scale (e.g., based on historical data). Reports can then be generated and output by evaluation component 87. Enhancement component 88 can block avatar from moving away from the advertising content based on the evaluation.

Figure 9:
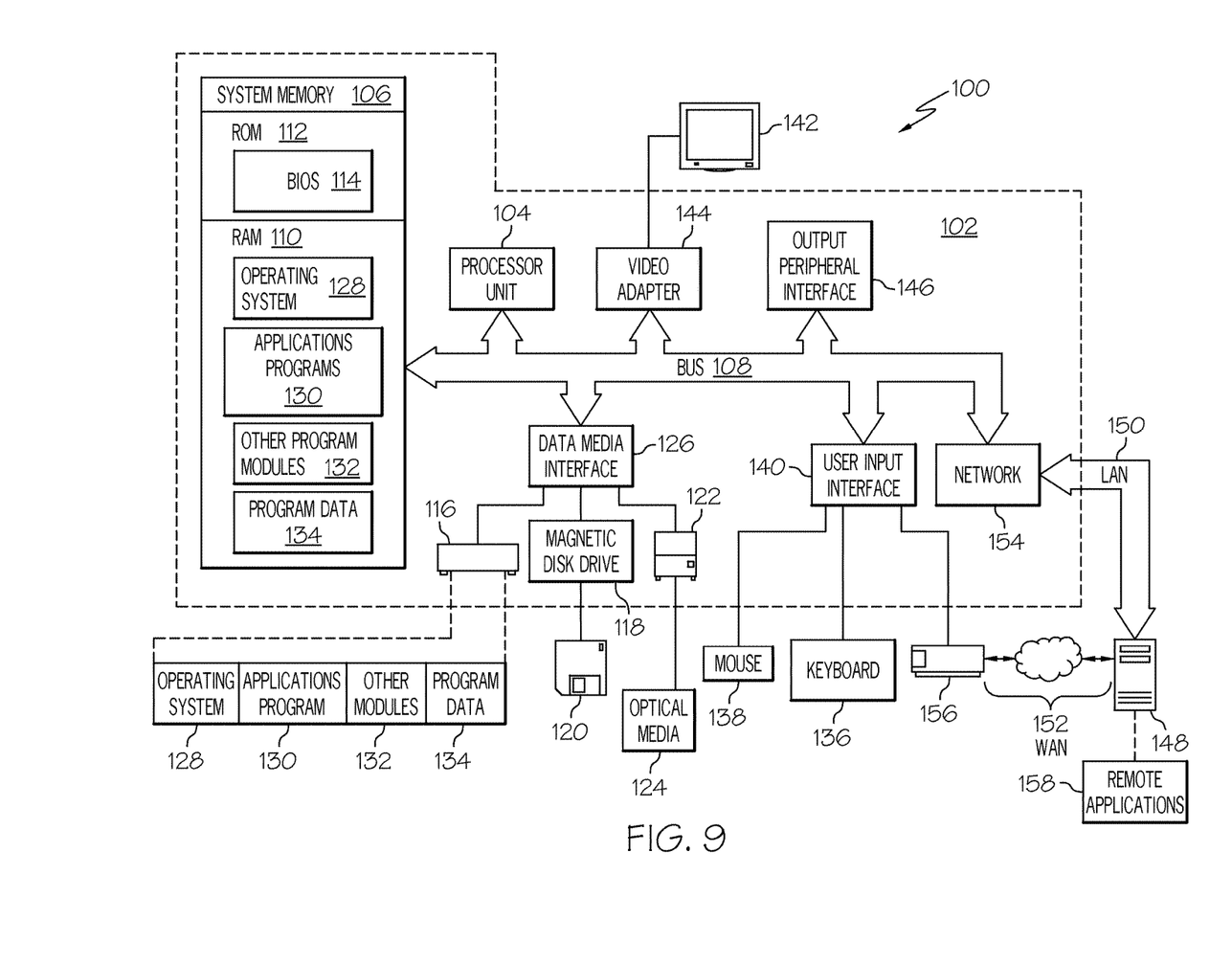
FIG. 9 shows a schematic of an exemplary computing environment in which elements of the networking environment shown in FIG. 1 may operate.

FIG. 9 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the invention described herein. Neither should computing environment 100 be interpreted as having any dependency or requirement relating to any one or combination of components illustrated in FIG. 9.

In the computing environment 100 there is a computer 102, which is operational with numerous other general purpose or special purpose computing system environments or configurations. Examples of well-known computing systems, environments, and/or configurations that may be suitable for use with computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Computer 102 may be described in the general context of computer-executable instructions, such as program modules, being executed by a computer. Generally, program modules include routines, programs, objects, components, logic, data structures, and so on that perform particular tasks or implement particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 9, computer 102 in the computing environment 100 is shown in the form of a general-purpose computing device. The components of computer 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 102 typically includes a variety of computer readable media. Such media may be any available media that is accessible by computer 102, and it includes both volatile and non-volatile media, removable and non-removable media.

In FIG. 9, system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 6 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. Hard disk drive 116, magnetic disk drive 118, and optical disk drive 122 are each connected to bus 108 by one or more data media interfaces 126.

The drives and their associated computer-readable media provide non-volatile storage of computer readable instructions, data structures, program modules, and other data for computer 102. Although the exemplary environment described herein employs hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on hard disk 116, magnetic disk 120, optical disk 122, ROM 112, or RAM 110, including, by way of example and not limitation, an operating system 128, one or more application programs 130, other program modules 132, and program data 134. Each of the operating system 128, one or more application programs 130 other program modules 132, and program data 134 or some combination thereof, may include an implementation of the networking environment 10 of FIG. 1 including server array 14 and virtual universe client 24. In one embodiment, the one or more application programs 130 include components of advertisement effectiveness utility 53, such as multidimensional grid component 80, tracking avatar component 82, monitoring and deriving component 84, and displaying component 86.

Figure 10:
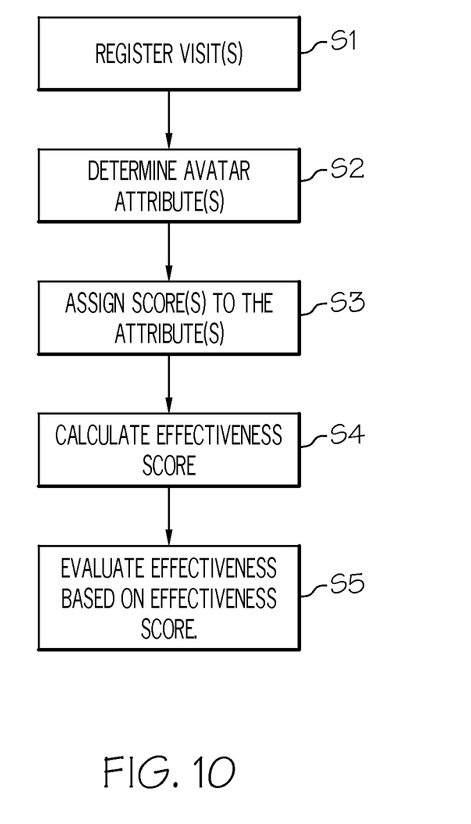
FIG. 10 shows a flow diagram of a method for monitoring user demographics in the virtual universe according to one embodiment of the invention.

The one or more program modules 130 carry out the methodologies disclosed herein, as shown in FIG. 10. According to one embodiment, in step S1, visit(s) by avatar (s) are registered. In step S2, avatar attributes are determined (e.g., avatar directionality, time, etc.). In step S3, score(s) are assigned to the attribute(s). In step S4, an effectiveness score is calculated based on the attribute scores. In step S5, effectiveness is evaluated based on the effectiveness score.

The flowchart of FIG. 10 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical functions. It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Referring back to FIG. 9, a user may enter commands and information into computer 102 through optional input devices such as a keyboard 136 and a pointing device 138 (e.g., a "mouse"). Other input devices (not shown) may include a microphone, joystick, game pad, satellite dish, serial port, scanner, camera, or the like. These and other input devices are connected to processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 9 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to system bus 108 via the user input interface 140 or other appropriate mechanism.

In a networked environment, program modules depicted relative to the personal computer 102, or portions thereof, may be stored in a remote memory storage device. By way of example, and not limitation, FIG. 6 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

In another embodiment, the invention provides a business method that performs the process of the invention on a subscription, advertising, and/or fee basis. That is, a service provider, such as a Solution Integrator, could offer to provide the functionality discussed herein. In this case, the service provider can create, maintain, support, etc., a computer infrastructure, such as computer infrastructure 102 (FIG. 9) that performs the process of the invention for one or more customers. In return, the service provider can receive payment from the customers under a subscription and/or fee agreement and/or the service provider can receive payment from the sale of advertising content to one or more third parties.

In still another embodiment, the invention provides a computer-implemented method for performing the functionality discussed herein. In this case, a computer infrastructure, such as computer infrastructure 102 (FIG. 9), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as processor unit 104 (FIG. 6), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

It is apparent that there has been provided with this invention a method for monitoring user demographics within a virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for navigating an avatar into a proximity and directionality favorable for viewing advertising content in a Virtual Universe (VU) of a multiplayer online game managed by at least one server, the method comprising:
   registering, by the at least one server, a visit by the avatar to a region of the VU that includes a target advertising content;
   determining, by the at least one server, a proximity to the target advertising content by the avatar;
   determining, by the at least one server, an avatar directionality of the avatar with respect to the target advertising content;
   determining, by the at least one server, a time with respect to which the avatar may be exposed to the target advertising content in the region;
   assigning, by the at least one server, at least one score to the visit, the proximity, the directionality, and the time;
   calculating, by the at least one server, an effectiveness score based on the at least one score;
   evaluating, by the at least one server, an effectiveness of the target advertising content by comparing the effectiveness score to a predetermined scale;
   automatically constructing, by the at least one server, a barrier blocking the avatar from moving away from the target advertising content based on the evaluating, the barrier comprising a landscape element; and
   inducing, by the at least one server, using the barrier, the avatar to navigate in such a way that the proximity and the avatar directionality of the avatar favor viewing of the target advertising content.

2. The method of claim 1, the at least one score being at least one numerical score.

3. The method of claim 1, the calculating comprising mathematically manipulating, by the at least one server, the at least one numerical score.

4. The method of claim 1, further comprising determining, by the at least one server, a camera directionality of a camera object of the avatar with respect to the target advertising content, the at least one score encompassing the camera directionality.

5. The method of claim 1, further comprising obscuring, by the at least one server, objects in the region other than the target advertising content based on the evaluating.

6. A method for navigating an avatar into a proximity and directionality favorable for viewing an advertisement in a Virtual Universe (VU) of a multiplayer online game managed by at least one server, the method, comprising:
assigning, by the at least one server, a visit score based on a quantity of visits by a set of avatars to a region of the VU that includes a target advertising content;
assigning, by the at least one server, a set of proximity scores based on a proximity of each of the set avatars to the target advertising content in the region;
assigning, by the at least one server, a set of avatar directionality scores based on a direction each of the set of avatars is facing with respect to the target advertising content in the region;
assigning, by the at least one server, a set of time scores based on a length of time each of the set of avatars is exposed to the target advertising content in the region;
determining, by the at least one server, on overall effectiveness of the target advertising content based on the visit score, the set of proximity scores, the set of directionality scores, and the set of time scores;
evaluating, by the at least one server, an effectiveness of the target advertising content by comparing the overall effectiveness to a predetermined scale;
constructing, by the at least one server, a barrier blocking the set of avatars from moving away from the target advertising content based on the evaluating, the barrier comprising a landscape element; and
inducing, by the at least one server, using the barrier, the set of avatars to navigate in such a way that both proximity and directionality of the set of avatars favor viewing of the target advertising content.

7. The method of claim 6, further comprising assigning, by the at least one server, a set of camera directionality scores based on a direction that each of a set of avatar camera objects was facing with respect to the target advertising content in the region, the determining being further based on the set of camera directionality scores.

8. A computer system for navigating an avatar into a proximity and directionality favorable for viewing advertising content in a Virtual Universe (VU) of a multiplayer online game, the computer system comprising:
at least one processing unit;
memory operably associated with the at least one processing unit; and
a utility stored in the memory and executable by the at least one processing unit, the utility comprising:
a module for registering a visit by the avatar to a region of the VU that includes a target advertising content;
a module for determining a proximity to the target advertising content by the avatar;
a module for determining an avatar directionality of the avatar with respect to the target advertising content;
a module for determining a time with respect to which the avatar may be exposed to the target advertising content in the region;
a module for assigning the at least one score to the visit, the proximity, the directionality, and the time;
a module for calculating an effectiveness score based on the at least one score;
a module for evaluating an effectiveness of the target advertising content by comparing the effectiveness score to a predetermined scale;
a module for constructing a barrier blocking the avatar from moving away from the target advertising content based on the evaluating, the barrier comprising a landscape element; and
a module for inducing, using the barrier, the set of avatars to navigate in such a way that both proximity and directionality of the set of avatars favor viewing of the target advertising content.

9. The computer system of claim 8, the at least one score being at least one numerical score.

10. The computer system of claim 8, the module for calculating being configured to mathematically manipulate the at least one numerical score.

11. The computer system of claim 8, further comprising a module for determining a camera directionality of a camera object of the avatar with respect to the target advertising content, the at least one score encompassing the camera directionality.

12. The computer system of claim 8, further comprising a module for obscuring objects in the region other than the target advertising content based on the evaluating.

13. A computer readable medium containing a program product for navigating an avatar into a proximity and directionality favorable for viewing advertising content in a Virtual Universe (VU) of a multiplayer online game, the computer readable medium comprising program code for causing a computer to:
register a visit by the avatar to a region of the VU that includes a target advertising content;
determine a proximity to the target advertising content by the avatar;
determine an avatar directionality of the avatar with respect to the target advertising content;
determine a time with respect to which the avatar may be exposed to the target advertising content in the region;
assign at least one score to the visit, the proximity, the directionality, and the time; and
calculate an effectiveness score based on the at least one score;
evaluate an effectiveness of the target advertising content by comparing the effectiveness score to a predetermined scale;
construct a barrier blocking the avatar from moving away from the target advertising content based on the evaluating, the barrier comprising a landscape element; and
induce, using the barrier, the set of avatars to navigate in such a way that both proximity and directionality of the set of avatars favor viewing of the target advertising content.

14. The computer readable medium containing a program product of claim 13, the at least one score being at least one numerical score.

15. The computer readable medium containing a program product of claim 13, the computer readable medium further comprising program code for causing the computer to mathematically manipulate the at least one numerical score.

16. The computer readable medium containing a program product of claim 13, the computer readable medium further comprising program code for causing the computer to determine a camera directionality of a camera object of the avatar with respect to the target advertising content, the at least one score encompassing the camera directionality.

17. The computer readable medium containing a program product of claim 13, the computer readable medium further comprising program code for causing the computer to obscure objects in the region other than the target advertising content based on the evaluating.

18. A method for deploying a system for advertising in a Virtual Universe (VU) of a multiplayer online game, the method comprising:
  register, via a computer infrastructure, a visit by an avatar to a region of the VU that includes a target advertising content;
  determine, via the computer infrastructure, a proximity to the target advertising content by the avatar;
  determine, via the computer infrastructure, an avatar directionality of the avatar with respect to the target advertising content;
  determine, via the computer infrastructure, a time with respect to which the avatar may be exposed to the target advertising content in the region;
  assign, via the computer infrastructure, at least one score to the visit, the proximity, the directionality, and the time;
  calculate, via the computer infrastructure, an effectiveness score based on the at least one score;
  evaluate, via the computer infrastructure, an effectiveness of the target advertising content by comparing the effectiveness score to a predetermined scale;
  construct, via a computer infrastructure, a barrier blocking the avatar from moving away from the target advertising content based on the evaluating, the barrier comprising a landscape element; and
  induce, via a computer infrastructure, using the barrier, the set of avatars to navigate in such a way that both proximity and directionality of the set of avatars favor viewing of the target advertising content.

19. The method of claim 18, further comprising: determine, via the computer infrastructure, a camera object of the avatar with respect to the target advertising content, the at least one score encompassing the camera directionality.

20. The method of claim 1, wherein the landscape element comprises at least one of a wall, a hedge, and a river integrated within the Virtual Universe.

21. The method of claim 6, wherein the landscape element comprises at least one of a wall, a hedge, and a river integrated within the Virtual Universe.

22. The computer system of claim 8, wherein the landscape element comprises at least one of a wall, a hedge, and a river integrated within the Virtual Universe.

23. The computer readable medium containing a program product of claim 13, wherein the landscape element comprises at least one of a wall, a hedge, and a river integrated within the Virtual Universe.

24. The method of claim 18, wherein the landscape element comprises at least one of a wall, a hedge, and a river integrated within the Virtual Universe.

* * * * *